No. 758,310. Patented April 26, 1904.

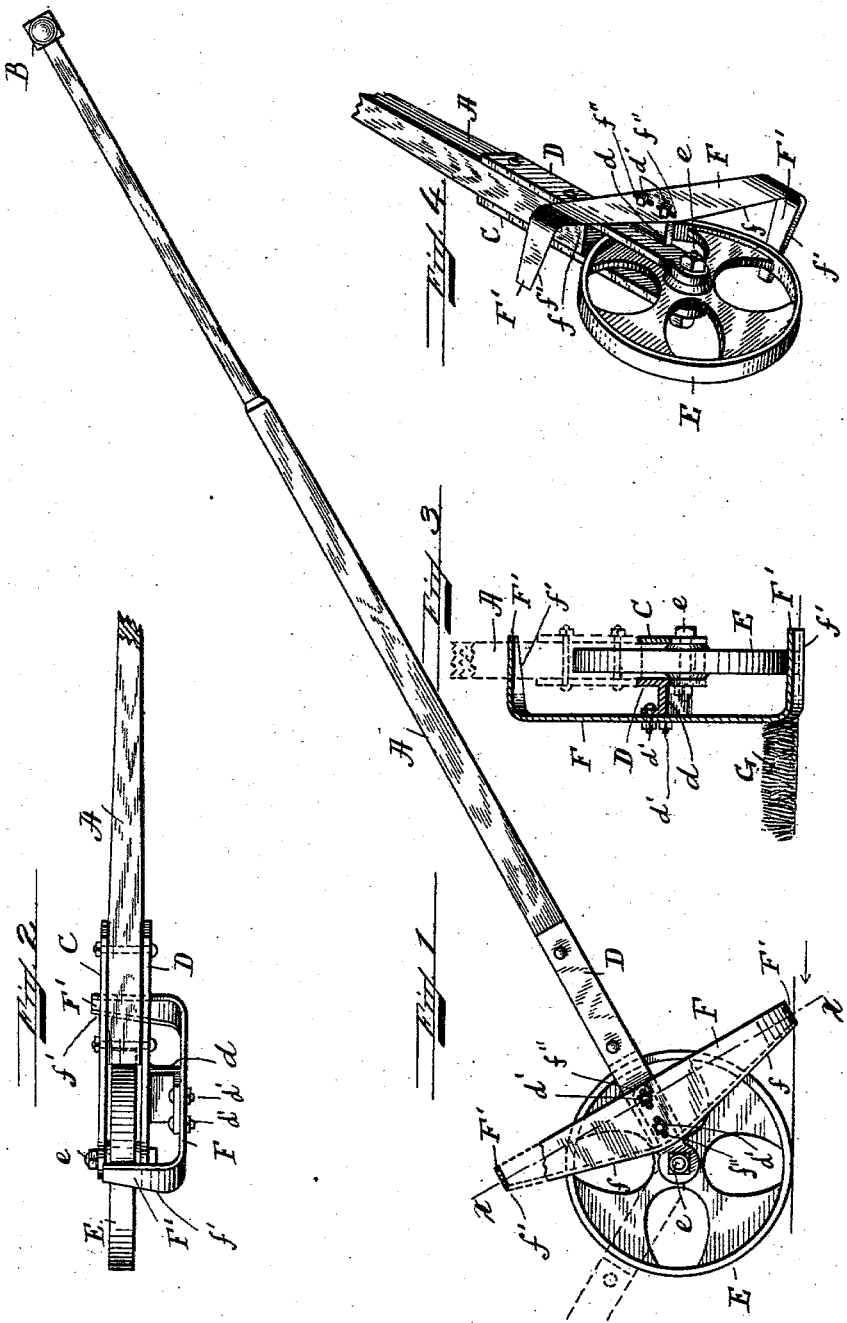

UNITED STATES PATENT OFFICE.

ARTHUR E. FULLER, OF DANVERS, MASSACHUSETTS.

LAWN-EDGE TRIMMER.

SPECIFICATION forming part of Letters Patent No. 758,310, dated April 26, 1904.

Application filed July 11, 1903. Serial No. 165,134. (No model.)

*To all whom it may concern:*

Be it known that I, ARTHUR E. FULLER, a citizen of the United States, and a resident of Danvers, in the county of Essex and State of Massachusetts, have invented certain new and useful Improvements in Lawn-Edge Trimmers, of which the following is a specification.

This invention relates to improvements in lawn-edge trimmers for the purpose of cutting and trimming the edges of grass lawns, garden-walks, borders, &c.; and it is carried out as follows, reference being had to the accompanying drawings, wherein—

Figure 1 is a side elevation of the invention. Fig. 2 is a top plan view of Fig. 1. Fig. 3 is a cross-section on the line X X shown in Fig. 1, and Fig. 4 is a perspective view of my improved lawn-edge trimmer.

Similar letters refer to similar parts wherever they occur on the different parts of the drawings.

In the drawings, A represents the handle-bar, provided at its upper end with a suitable handle B, as is common in devices of this kind. To opposite sides of the lower end of the bar A are secured metal plates C D, to the lower ends of which is journaled upon a pin $e$ the wheel E, as shown.

Integral with or secured to the metal plate or strap D is made a lateral outwardly-projecting bracket $d$, to which the edge-trimmer blade is attached. Said cutter-blade is made ⊐-shaped in section and composed of a vertical trimmer-blade F, having inclined cutting edges $f$ $f$, the ends of which extend at right angles, as shown at F' F', and provided with sharpened edges $f'$ $f'$, as shown in the drawings.

G in Fig. 3 represents the grass lawn the edge of which is to be trimmed.

In using the device the operator takes hold of the handle B and pushes the device in the direction of the arrow shown in Fig. 1 and guides the cutter-blade F close up to the edge of the grass border G that is to be trimmed, causing a vertical cut to be made in the sward, by which a portion thereof is severed with a drawing cut by reason of the inclination of the cutting edge $f$. The portion of the turf thus cut away by said blade F is detached from the main portion of the lawn by the horizontal portion F', which I term the "lifter" or "slicer," and by this operation I am enabled to trim the edge of a lawn, walk, border, &c., by simply guiding the device and pushing it forward, as above described.

In practice I prefer to secure the cutter-blade F in an adjustable manner to the bracket $d$—that is, I provide means for adjusting the said blade on the bar A to and from the center of the wheel E, as shown, according to the height of the person operating the device. Thus for a tall person I secure the cutter-blade a little nearer to the center of the wheel E, and when used by a shorter person I secure said cutter-blade a little farther away from the center of said wheel E, so as to cause the angular lifter or slicer blade F' to be guided properly relative to the depth of the cut that is being made and the thickness of the sliced turf portion that is to be detached. In practice I make for this purpose, preferably, slotted perforations $f''$ $f''$ in the blade F and secure the latter in an adjustable manner to the bracket $d$ by means of fastening-bolts $d'$ $d'$, as shown.

By having lifter or slicer projections F' in both ends of the edge-trimmer blade F the handle-bar A may be swung to the position shown in dotted lines in Fig. 1 when it is desired to push the device in an opposite direction.

The invention is very simple in construction and can be easily operated for the purpose of readily trimming the edges of lawns, &c., as hereinabove shown and described.

What I wish to secure by Letters Patent and claim is—

1. A lawn-edge trimmer, consisting of a handle bar or frame and plates or straps secured to its lower end, and a wheel journaled thereon, in combination with a vertical cutter-blade F, secured at one side of said frame or bar, and having angular lifter or slicer blades F', F', at its ends, substantially as and for the purpose set forth.

2. A lawn-edge trimmer, consisting of a frame or bar, and a wheel journaled at its lower end, combined with a lateral bracket or projection $d$, secured to one side of said frame or bar, and a vertical cutter-blade F, secured to said bracket and having angular lifter or slicer blades F', F', at its ends, substantially as and for the purpose set forth.

In testimony whereof I have affixed my signature in presence of two witnesses.

ARTHUR E. FULLER.

Witnesses:
ALBAN ANDRÉN,
ELLEN O. WILLIAMS.